United States Patent [19]

Hansche et al.

[11] Patent Number: 5,600,057
[45] Date of Patent: Feb. 4, 1997

[54] METHOD OF LEAK DETECTION IN A HEAT EXCHANGER COMBUSTION CHAMBER

[76] Inventors: Thomas P. Hansche, deceased, late of Wynnewood, Okla.; Betty R. Hansche, administrator, 505 S. Sebers, Wynnewood, Okla. 73098

[21] Appl. No.: 615,548

[22] Filed: Mar. 11, 1996

[51] Int. Cl.⁶ ..................... G01M 3/04
[52] U.S. Cl. ............... 73/40.7; 73/49.2
[58] Field of Search ............. 73/49.2, 40.7, 73/40.5 R

[56] References Cited

U.S. PATENT DOCUMENTS 5,170,840  12/1992  Grunwald ................... 165/1
5,357,782  10/1994  Henry ....................... 73/40.7

Primary Examiner—Hezron E. Williams
Assistant Examiner—Jay L. Politzer
Attorney, Agent, or Firm—Robert K. Rhea

[57] ABSTRACT

A method of detecting leaks in a forced air furnace heat exchanger combustion chamber wall burning a blue color flame of gas includes introducing a fine mist of a liquid fire retardant compound into the return air stream upstream from a blower forcing air across the wall of the combustion chamber. Any change in the blue color of the flame toward an orange color indicates a gas leak through the combustion chamber wall.

2 Claims, No Drawings

METHOD OF LEAK DETECTION IN A HEAT EXCHANGER COMBUSTION CHAMBER

BACKGROUND OF THE INVENTION

This invention relates to a method and compound for testing the integrity of a blue flame gas fired forced air furnace combustion chamber.

1. Field of the Invention

Central air conditioning units presently in use usually contain a heat exchanger which heats the air circulated through a building space during cool or cold weather. The gas fired heat exchanger acts as a furnace in an air conditioning system and includes a combustion chamber having its exterior surface in intimate contact with the return air to be heated before being moved to the building space for heating the latter. However, as a result of the expansion and contraction of metal, from which the combustion chamber is usually formed, minute cracks or pin holes develop in welds joining edges of the metal which allows carbon monoxide or other noxious fumes to enter the breathable air stream moving across the combustion chamber.

This invention provides an economical compound and easily executed method for determining whether or not the integrity of the heat exchanger cell, of the gas fired blue flame forced air furnace, has been compromised such that it allows communication between the conditioned air supply and the combustion chamber of the system.

2. Description of the Prior Art

U.S. Pat. No. 5,170,840 issued Dec. 15, 1992 to Grunwald for METHOD FOR DETECTING BREACHES IN HEAT EXCHANGER TUBING, and U.S. Pat. No. 5,357,782 issued Oct. 25, 1994 to Henry for LEAK DETECTION IN HEATING, VENTILATING AND AIR CONDITIONING SYSTEMS USING AN ENVIRONMENTALLY SAFE MATERIAL are considered good examples of the state-of-the-art. The Grunwald patent *840 requires the inner and outer surfaces of a tubing type heat exchanger to be cleaned internally by an acid aqueous solution and its outer surface similarly cleaned by the aqueous solution or mechanical means. A colored admixture is introduced into the heat exchanger for visually inspecting the exterior of the heat exchanger to determine if any of the colored admixture has seeped through cracks in the heat exchanger.

The Henry Patent *782 discloses adding a compound mixture to a refrigerant system and inspecting the system under ultraviolet light for the indication of any leakage.

This invention is believed distinctive over these and other patents by providing an economical, and easily performed method of detecting leaks in a gas fired heat exchanger while the unit is in operation by adding a mist of a solution, containing a fire retardant, into a heat exchanger by air pressure differential which discolors the normal blue flame of a gas fired heat exchanger to indicate that the heat exchanger cell has been compromised.

SUMMARY OF THE INVENTION

A powder form of a fire retardant compound is dissolved in a given quantity of water and sprayed, as a mist, into the return air stream of a forced air furnace at the position of the fan or blower wheel forcing air through a heat exchanger containing a gas fired combustion chamber. Air pressure differential between the exterior and interior of the combustion chamber moves air and vapors of the mixture into the combustion chamber if leaks are present in the wall of the combustion chamber which results in a discoloration of the normal blue flame of a gas fired heat exchanger.

The principal object of this invention is to provide an inexpensive, easily formulated liquid compound which is sprayed in mist form into the return air stream of a central air conditioning system for visually determining whether or not the heat exchanger combustion chamber is leaking noxious fumes into the breathable air stream.

DESCRIPTION OF THE PREFERRED EMBODIMENTS

This invention is directed to a method for detecting leaks in the combustion chamber of a blue flame gas fired heat exchanger heating air in a closed air conditioning system. In carrying out the invention, a selected quantity of fire retardant material, in powder form, is dissolved at ambient temperature, in a given quantity of water. The ratio of the fire retardant liquid is preferably four tablespoons of sodium bicarbonate completely dissolved in one quart of water.

A selected quantity of the liquid mixture is placed in a hand held mist sprayer and manually sprayed into the return air stream at the position of the forced air fan, commonly called a "blower wheel", upstream from the position of a gas fired blue flame combustion chamber. The air stream flowing across the exterior of the combustion chamber is under greater air pressure than the interior of the combustion chamber, whereby any leaks such as cracks or pinholes in the wall of the combustion chamber causes some of the compound to infiltrate enter the combustion chamber which, by contacting the blue flame in the combustion chamber turns the flame to an orange color. Visually observing the combustion chamber flame while the mist is sprayed into the return air stream reveals whether or not the combustion chamber wall has been breached.

In the event the combustion flame visually appears orange color or flickers with orange color, the heat exchanger is rejected for replacement by a new unit.

If no evidence of combustion flame color change from blue is evident while the liquid compound is being sprayed into the return air stream, the heat exchanger has passed the test.

Obviously the invention is susceptible to changes or alterations without defeating its practicability. Therefore, I do not wish to be confined to the preferred embodiment.

I claim:

1. A method of detecting a gas leak in the wall of a heat exchanger combustion chamber disposed in the return air path downstream from a blower means moving air to be heated across the combustion chamber in a gas fired forced air furnace normally generating a blue color gas flame, the detection method comprising the following steps:

a) providing a liquid compound containing four parts by measure of sodium bicarbonate dissolved in one part by measure of a liquid;

b) introducing a mist spray of said compound into the air stream adjacent and upstream from said blower means while simultaneously visually inspecting the combustion chamber gas flame;

c) in the event that during step (b) any change toward an orange color flame is discernable in the combustion chamber thereby indicating a leak in the wall of the combustion chamber: rejecting the combustion chamber; and, d) in the event that during step (b) no change in the blue color of the combustion chamber flame is discernable;

thereby indicating an imperforate combustion chamber wall: accepting the combustion chamber for continued use.

2. A method of detecting a gas leak in the wall of a heat exchanger combustion chamber disposed in the return air path downstream from a blower means moving air to be heated across the combustion chamber in a gas fired forced air furnace normally generating a blue color gas flame, the detection method comprising the following steps:

a) providing a liquid flame retardant compound containing four tablespoons of sodium bicarbonate powder dissolved in one quart of water;

b) introducing a mist spray of said compound into the air stream adjacent and upstream from said blower means while simultaneously visually inspecting the combustion chamber gas flame;

c) in the event that during step (b) any change toward an orange color flame is discernable in the combustion chamber; thereby indicating a leak in the wall of the combustion chamber: rejecting the combustion chamber; and, d) in the event that during step (b) no change in the blue color of the combustion chamber flame is discernable; thereby indicating an imperforate combustion chamber wall: accepting the combustion chamber for continued use.

* * * * *